US008520714B2

(12) United States Patent
Higgins (10) Patent No.: US 8,520,714 B2
(45) Date of Patent: Aug. 27, 2013

(54) BURNER/INJECTOR PANEL APPARATUS (75) Inventor: Christopher K. Higgins, Kennesaw, GA (US)

(73) Assignee: Air Liquide Advanced Technologies U.S. LLC, Houston, TX (US)

( * ) Notice: Subject to any disclaimer, the term of this patent is extended or adjusted under 35 U.S.C. 154(b) by 1189 days.

(21) Appl. No.: 12/411,777

(22) Filed: Mar. 26, 2009

(65) Prior Publication Data

US 2009/0245319 A1 Oct. 1, 2009

Related U.S. Application Data (60) Provisional application No. 61/040,511, filed on Mar. 28, 2008.

(51) Int. Cl.
| | |
|---|---|
| *H05B 7/22* | (2006.01) |
| *F27D 1/00* | (2006.01) |
| *F27D 1/12* | (2006.01) |
| *C21C 7/00* | (2006.01) |
| *C21C 5/48* | (2006.01) |

(52) U.S. Cl.
USPC ............ 373/63; 373/66; 373/75; 373/76; 266/241; 266/216; 266/217; 266/218

(58) Field of Classification Search
USPC ............ 373/60–66, 71–76, 79; 266/216–218, 266/241, 225, 226, 265, 223; 432/2, 8, 13, 432/19, 20, 159
See application file for complete search history.

(56) References Cited

U.S. PATENT DOCUMENTS

| | | | |
|---|---|---|---|
| 4,703,336 | A | 10/1987 | Ovshinsky et al. |
| RE33,464 | E * | 11/1990 | Gitman ........................ 432/13 |
| 5,166,950 | A | 11/1992 | Jouvaud et al. |
| 5,373,530 | A | 12/1994 | Perrin |
| 5,444,733 | A | 8/1995 | Coassin et al. |
| 5,471,495 | A | 11/1995 | Berger et al. |
| 5,802,097 | A | 9/1998 | Gensini et al. |
| 5,835,534 | A * | 11/1998 | Kogure ........................ 375/257 |
| 6,212,218 | B1 | 4/2001 | Shver |
| 6,289,035 | B1 | 9/2001 | Shver |
| 6,342,086 | B1 | 1/2002 | Shver |
| 6,372,010 | B1 | 4/2002 | Shver |
| 6,614,831 | B2 | 9/2003 | Shver |
| 6,999,495 | B2 | 2/2006 | Popenov et al. |
| 7,483,471 | B2 * | 1/2009 | Shver ........................... 373/76 |
| 2007/0058689 | A1 * | 3/2007 | Rymarchyk et al. .......... 373/76 |

FOREIGN PATENT DOCUMENTS

| | | |
|---|---|---|
| EP | 0639750 A1 * | 2/1995 |
| EP | 1884731 | 2/2008 |
| FR | 1032566 | 7/1953 |
| GB | 1072121 | 6/1967 |
| GB | 2280501 | 2/1995 |
| JP | 62063697 | 4/1987 |

OTHER PUBLICATIONS

Search Report and Written Opinion for PCT/US2009/038387.

* cited by examiner

*Primary Examiner* — Quang Van
*Assistant Examiner* — Hung D Nguyen
(74) *Attorney, Agent, or Firm* — Christopher J. Cronin (57) ABSTRACT

An apparatus and method for use in metal melting, refining and/or other processing, such as, for example, steel making in an electric arc furnace (EAF), and more particularly, to improved burner/injector panels and related methods for the introduction of various energy sources, such as, for example, chemical energy, oxygen and particulates into an EAF.

24 Claims, 4 Drawing Sheets

FIG. 1

VIEW A
FIG. 3

FIG. 2

SECTION B-B
FIG. 5

SECTION C-C
FIG. 6

VIEW A

BURNER/INJECTOR PANEL APPARATUS

FIELD OF THE INVENTION

The present invention relates to a burner/injector panel apparatus for use in the melting, refining and processing of metals. More particularly, the present invention relates to a burner/injector panel for use in metal melting furnaces and/or the like. The present invention further relates to an improved process for injecting oxygen into a small capacity furnace.

BACKGROUND

The art of steel making is very well developed. In general, an electric arc furnace (EAF) is used to make steel by application of an electric arc to melt one or more of scrap metal and/or other alternative iron bearing feed stocks and alloys that are placed within the furnace. Other methods to make steel include enhanced versions of EAFs that make steel by melting DRI (direct reduced iron) combined with the hot metal from a blast furnace. To enhance the steel making process, additional chemical energy is provided to the furnace by auxiliary means. The most common forms of auxiliary means comprise burners, injectors, and jets using fuel and an oxidizing gas to produce combustion products with a high heat content to assist the arc.

Further processes include multiple movable or permanently fixed burners utilizing hydrocarbon fuel such as, for example, natural gas or oil, at least one movable oxygen lance for injection of a stream of oxygen toward the molten bath for refining purposes and a movable means for injecting solid carbonaceous fuel for combustion and slag foaming purposes.

In the general process of EAFs, scrap metal, or charges, are dumped into the furnace through an opening. Typically these charges further include carbon particulate and other slag forming materials. Other known processes comprise using a ladle for hot or heated metal from a blast furnace and inserting it into the EAF furnace, such as by injection of the DRI by a lance.

There are numerous phases of charge processing in an EAF furnace and/or an EAF-like furnace. In the melting phase, the electric arc and burners melt the charge burden into a molten pool of metal (melted metal), called an iron carbon melt, which accumulates at the bottom or hearth of the furnace. Most commonly, after melting the charge, an electric arc furnace proceeds to a refining and/or decarburization phase. In this phase, the metal melt continues to be heated by the arc until slag forming materials combine with impurities in the iron carbon melt and rise to the surface as slag. When the iron carbon melt reaches a critical temperature which allows a carbon boil, the charged carbon in the melt combines with any oxygen present in the bath to form carbon monoxide bubbles which rise to the surface of the bath, forming foaming slag. The foaming slag acts as an insulator throughout the furnace.

When an electric arc furnace operates without burners, the charged scrap or charge rapidly melts at the hot spots at regions of highest electric current density, but often remains un-melted at the cold spots (those spots of lowest electric current density). This creates harsh conditions for the portion of the furnace wall and refractory lining located at the hot spots due to excessive exposure to heat from the arc during the latter portions of the melt down cycle. Scrap located in the cold spot regions receives heat from the arc at a reduced rate during the melt down cycle, thereby creating the cold spots. To melt charge scrap in the cold spots, the heat is applied for a longer period of total time, thereby also resulting in applying heat to the hot spots for longer than necessary. This asymmetrical heat distribution from the arc and non-uniform wear of the furnace walls are typical for both alternating current and direct current arc furnaces operating without burners.

The cold spots are typically formed in areas further away from the furnace arc as scrap located in these areas receives electrical energy at a reduced rate per ton of scrap. The electrical energy is the weakest in line with the bisect of the angle between the electrodes forming cold spots. Another typical example of a cold spot is the tapping spout, due to its location away from the arc. Still another cold spot occurs at the slag door due to excessive heat losses to ambient air which infiltrates through this area. An even further common source for cold spots in furnaces occurs at the places where additional materials are injected, such as slag forming material, direct reduced iron, lime, etc., (which is inserted through a slag door or through an opening in the furnace side wall) due to the heat consumption of these materials as they melt down.

Prior art solutions to these challenges have been to incorporate further burners around the furnace in order to apply additional sources of heat to the cold spots. Electric arc furnaces equipped with burners located at cold spots have improved uniformity of scrap melting and have reduced build-ups of materials at the cold spots. When auxiliary heat sources such as burners are placed in the electric arc furnace, their location is chosen to avoid further overheating of hot spots that result from the rapid melting of scrap located between the electrode and the furnace shell. More specifically, the burners are located as far away from hot spots as is practically possible and the burner flame outlet opening direction is chosen so that flame penetration occurs predominantly into the scrap pile located at the cold spots and not to already heated portions of the furnace.

Further heating and processing is realized by a decarburization process wherein, in typical embodiments of the prior art utilizing advanced or more modern EAF techniques, a high velocity, usually supersonic, flow(s) of oxygen is blown into the metal bath with either lances or burner/lances to decarburize the bath by oxidation of the carbon contained in the bath, forming CO and/or $CO_2$ when combined with the available or excess carbon in the bath. The burner(s)/lance(s) act more uniformly to melt the charge and lessen, or prevent, overheating and minimize the time required for the melt and time that the arc is operated.

By injecting the metal bath or liquid metal with oxygen, the dissolved carbon content of the bath can be reduced to a selected or reduced level. It is commonly regarded that if an iron carbon melt is under 2% carbon, the melt becomes steel. EAF steel making processes typically begin with burdens having less than 1% carbon. The carbon in the steel bath is continually reduced until it reaches the content desired for producing a specific grade of steel, such as, for example, and not by way of limitation, down to less than 0.1% for low carbon steels.

In an effort to decrease steel production times in electric arc furnaces, various apparatus and methods have been developed to alter the means of delivering further energy to the furnace. Such improvements include, but are not limited to, conventional burners mounted on the water-cooled side walls (panels or furnaces), conventional lances, conventional burners, and/or the like.

Typically, oxygen injection for the decarburization must wait until the melting phase of the process is substantially complete before starting high velocity injection of oxygen. This is since the burners cannot effectively deliver high velocity oxygen before then because unmelted charge may exist between the burners/lances and the liquid metal or metal melt. The oxygen flow would be deflected, potentially causing severe damage to the furnace and burner/injector panel.

This fact is further aggravated by the generally spherical shape of most EAF furnace structures. Melting of the metal typically occurs in the middle, lower portion of the melt and expands to fill the sides. Early in the melting phase a high velocity oxygen stream has less effect and/or ability to penetrate a not fully melted charge (metal) to decarburize the metal melt.

The same philosophy that is used in selecting the location of additional burners is used to select the location of other additional auxiliary heat sources including oxygen injection lances for use in decarburization. When additional lances are located at the cold spot(s), the exothermic energy of melt refining can be used more effectively to melt the scrap without overheating the hot spots.

Additional injection of oxygen for melt decarburization can be accomplished by any number of means. Common types of apparatus and processes include one or more movable devices, such as submerged, consumable oxygen pipes and/or by one or more water-cooled non-submerged oxygen lances. Often during operation of a water-cooled lance, the lance is first introduced into the furnace, then gradually moved to the position (sometimes in a fixed position) in which the lance discharge opening or openings for the introduction of oxygen are located, preferably approximately 150-300 mm or more above the bath. The discharge velocity of the oxygen stream from the lance is to be chosen to allow the stream of oxygen introduced by the lance located in the working position to penetrate the slag and to react with the iron-carbon melt without excessive molten metal splashing on the furnace walls and electrode(s). However, inadvertent metal splashing does occur and is a common cause of apparatus failure.

Combined injection of carbon and oxygen via various apparatus, including dedicated lances in and around the furnace wall has become a common practice for adding extra heat to the process. Typically, the supply of carbon flow for injection is obtained from a carbonaceous material dispenser, such as a compressed gaseous carrier comprising compressed air, natural gas, nitrogen, and/or the like.

The use of the burners together with carbon and oxygen lances has allowed electric steelmakers to substantially reduce electrical energy consumption and to increase furnace production rate due to the additional heat input generated by the oxidation of carbon, and by significant increases in electric arc thermal efficiency achieved by the formation of a foamy slag layer that insulates the electric arc from heat losses. The foamy slag also stabilizes the electric arc and therefore allows for a higher electrical power input rate. The foamy slag layer is created by CO bubbles which are formed by the oxidation of injected carbon to CO. The increased flow of injected carbon creates increased localized CO generation. Accordingly, most EAF furnace units also comprise a post production means for removing or reducing CO levels in the off gas. Mixing of the CO with oxygen inside of the electric arc furnace is desirable but very difficult to arrange without excessive oxidation of the slag and electrodes. Accordingly, the art field has developed post-production means for treating the high CO content of the off gas.

Most modern electric arc furnaces are equipped with all or some of the above-mentioned means for auxiliary heat input and or metal melting. Along with improvements in the design and operation of metal melting furnaces have come improvements in burner panel design. For example, various burner panel configurations are disclosed in U.S. Pat. No. 4,703,336; U.S. Pat. No. 5,444,733; U.S. Pat. No. 6,212,218; U.S. Pat. No. 6,372,010; U.S. Pat. No. 5,166,950; U.S. Pat. No. 5,471,495; U.S. Pat. No. 6,289,035; U.S. Pat. No. 6,614,831; U.S. Pat. No. 5,373,530; U.S. Pat. No. 5,802,097; U.S. Pat. No. 6,999,495; and U.S. Pat. No. 6,342,086. Such prior art patents have proven to be beneficial. For example, U.S. Pat. No. 6,999,495 has found wide applicability for increasing spatial energy coverage in a furnace. Likewise, U.S. Pat. No. 6,614,831 has found applicability in extending the reach of various tools, such as a burner or a lance, into the interior of a furnace. However, there is still a need for further improved apparatus and methods for the melting of metals which are even more efficient than the prior art apparatus and methods and which result in a decrease in burner/injector panel failure.

One of the causes of burner/injector panel failure is "flashback", "blowback", "rebound", and/or "jet reflection". These terms commonly refer to a condition resulting from the jet (oxygen lance or burner jet) being reflected back to the panel regardless of whether the reflection is caused from the steel bath or melting metals (scrap materials inside the furnace that are not yet melted). The use of the term "flashback" throughout this specification shall mean and refer to all of the aforementioned terms unless specifically stated otherwise. Prior art solutions to various challenges associated with flashback have been dealt with by shielding the burner jet and/or lance. However, shielding often results in increasing the distance from the burner or lance to the steel bath or melting metals. Accordingly, there is a need for apparatus and methods in which the distance from a burner jet nozzle or lance nozzle to the molten metal is minimized while at the same time providing enhanced shielding and/or protection for a burner jet and/or burner jet nozzle.

Another problem with the prior art is that it's application has been mainly limited to larger furnaces (those have a capacity greater than 40 tons). Therefore, there is a need to have a panel that will work not only in large capacity furnaces but also smaller furnaces.

An additional problem with the panels of the prior art is that the cooling circuits in the panels have been made (formed in the panels) using sand casting processes. When using sand casting, it is necessary to drill holes into the cooling circuits of the panel in order to remove the sand. Plates or plugs then have to be welded over the holes to preserve the integrity of the cooling circuit within the panel (to make certain that the water does not seep out of the cooling circuit and into the furnace). In such cases it is even more important to protect the panel from splash back since repeated exposure of the plates to molten metal can result in seepage of water from the cooling system into the furnace. The presence of water creates an unacceptable hazard. As a result, the panel will have to be removed and in many instances replaced. Accordingly, there is also a need to have a panel that can overcome this problem.

SUMMARY OF THE INVENTION

The present invention relates to a burner/injector panel apparatus and related methods for use in a metal melting furnace. In general, the present invention relates to a burner/injector panel having enhanced characteristics and related methods that result in at least increased operational efficiency and/or increased service life for the burner/injector panel apparatus. The burner/injector panel apparatus of the present invention generally comprises a water-cooled burner/injector panel, at least one apparatus bore disposed within the water-cooled burner/injector panel that traverses the water-cooled burner/injector panel; and at least one injection apparatus seated or disposed in the at least one apparatus bore. The burner/injector panel extends outwardly and downward from the wall of the furnace toward the metal melt line. The injection apparatus is selected from one or more of a thermal energy source, a particulate injector, or an oxygen injector. The present invention further comprises a process for improved injection of a product such as oxygen, or carbon particulate into an electric arc furnace, using the burner/injector panel of the present invention.

BRIEF DESCRIPTION OF THE FIGURES

The invention will be described with additional specificity and detail through the use of the accompanying figures in which.

DETAILED DESCRIPTION OF THE INVENTION

The present invention comprises a burner/injector panel apparatus for use in metal melting, refining and/or processing within a furnace. More specifically, the burner/injector panel apparatus of the present invention can be used in the production of steel in an electric arc furnace (EAF) where the burner/injector panel apparatus will be mounted onto the side wall of the furnace. As used herein, reference to the burner/injector panel apparatus being mounted onto the side wall of the furnace also encompasses embodiments where the burner/injector panel apparatus is mounted to and extends through the furnace wall.

It has now been found that through the use of the specific burner/injector panel apparatus configurations claimed which includes one embodiment with at least one transition region in the body of the panel and another embodiment of a first transition region in the body of the panel and a second transition region positioned in the mid-region of the body of the panel which includes an eccentric increase in the body of the panel, it is possible to specifically place the panel apparatus within the furnace in such a manner as to allow for the discharge end of the panel to extend toward the melt line of the furnace. More specifically, in those embodiments in which the furnace includes a split line, a distance from the point where the bottom of the panel is in contact with the furnace wall at least to, or below, the split line of the furnace and toward the melt line of the furnace. In those embodiments where there is no split line in the furnace, the discharge end of the panel extends at least 40% of the distance from the point where the bottom of the panel is in contact with the furnace wall to the metal line of the furnace. In addition, by allowing this specific placement of the injector/burner panel apparatus and the specific configurations claimed, it is possible to provide enhanced characteristics in the form of increased operational efficiency and/or increased service life for the burner/injector panel and/or injection apparatus while at the same time decreasing the overall size of the burner/inject panel apparatus. In addition, many other enhanced characteristics of various embodiments of a burner/injector panel apparatus will become apparent throughout this specification.

The burner/injector panel apparatus of the present invention generally includes a burner/injector panel, at least one apparatus bore (which may also be referred to as an aperture) which traverses and is disposed within the burner/injector panel and at least one injection apparatus configured to be positioned within the apparatus bore. As used herein, the phrase "burner/injector panel", in terms of the various embodiments of the present invention, is a sidewall mounted panel. As further used herein, the phrase "injection apparatus" is defined as either a thermal energy source such as an oxy-fuel burner, a particulate injector or an oxygen injector. In certain embodiments of the present invention, more than one apparatus bore may be present in the burner/injector panel and/or more than one injection apparatus may be present in each individual bore in the burner/injector panel.

The burner/injector panel of the present invention comprises a panel body in the form of one solid cast or molded piece that includes a first end, a first transition region adjacent to the first end, a discharge end that opposes the first end and a mid-region that is disposed between the first transition region and the discharge end. More specifically, the panel body comprises (a) a mounting end; (b) a first transition region; (c) a mid-region that includes (i) a first cylindrical region, (ii) an optional second transition region and (iii) an optional second cylindrical region; and (d) a terminating region, wherein the first transition region and mid-region each have an upper outer surface, with the upper outer surfaces of these regions lying in the same plane with one another. In addition, the mounting end, first transition region, mid-region and terminating region are all in fluid communication with one another through one or more apparatus bores that are disposed in the panel body in such a manner as to traverse each of the named divisions of the body of the panel.

The mounting end of the burner/injector panel corresponds to the first end of the panel body and the terminating region corresponds to the discharge end of the panel body. With regard to the interrelationship of the various divisions or sections of the panel body, in one embodiment of the present invention, the mounting end is in communication with the first transitional region which is in communication with the first cylindrical region which is in communication with the second transition region which is in communication with the second cylindrical region which is in communication with the terminating region. In a second alternative embodiment, the mounting end is in communication with the first transitional region which is in communication with the first cylindrical region which is in communication with the terminating region.

As used herein, the phrase "transition region" refers to the outer external profile of a specific region of the panel body in terms of size and shape, in which the region transitions from either a smaller outer profile to a larger outer profile (as is the case of the second transition region which goes from the smaller outer profile of the first cylindrical region to the larger outer profile of the second cylindrical region) or from a larger outer profile to a smaller outer profile (as is the case of the first transition region which goes from the larger outer profile of the mounting end to the smaller outer profile of the first cylindrical region). This is compared to the outer profiles of the "first cylindrical region" and the "second cylindrical region" where the respective outer profiles of the regions remains relatively constant throughout the region—from one end of the region to the other end of the region. As used herein, the term "profile" refers to the outline of the specific region referenced of the panel, formed on a vertical plane passed through the object at right angles to one of its principal horizontal dimensions—in this particular instance, at right angles to the direction in which the bore traverses the panel. This transition can be in terms of not only size but also shape. For example, in the instance where the mounting end is in the form of a rectangle, the first transition region will include not only a change in size but also a change in shape—from a rectangular outer profile at the beginning of the first transition region (where the first transition region meets the mounting end) to a substantially cylindrical or cylindrical outer profile at the end of the first transition region (where the first transition region meets the first cylindrical region).

As noted, the mounting end of the panel body forms the first end of the burner/injector panel. This first end may be any shape but is generally rectangular in shape. The mounting end has a back face positioned towards the outside or supply side of the burner/injector panel apparatus and is adapted to allow for the mounting of the burner/injector panel apparatus to an inside wall of a furnace or in the alternative, the mounting of the burner/injector panel apparatus to and through the inside wall of a furnace.

The terminating region of the panel body of the burner/injector panel forms the discharge end of the panel body and is in the shape of a half spheroid. The product(s) to be injected (oxy-fuel, particulate or oxygen) are injected from the one or more injection apparatus positioned within the one or more bores that are included in the panel body, via the discharge end of the panel body.

As noted above, the configuration of the body of the panel includes a number of regions/divisions that are in fluid communication with one another. Taking into consideration these regions/divisions, there are at least two separate embodiments. In the first and most preferred of these embodiments, the mid-region includes a first cylindrical region, a second transition region and a second cylindrical region. In the second of these embodiments, the mid-region includes only a first cylindrical region.

Accordingly, with regard to the first embodiment of the present invention, the panel body comprises a mounting end, a first transition region, a mid-region (that comprises a first cylindrical region, a second transition region and a second cylindrical region) and a terminating region. With regard to this embodiment, there is an angular change between the mounting region and the first transition region (this angle corresponding to the angle of the panel with regard to the horizontal). A straight line is formed by the upper outer surfaces between the first transition region and the terminating region. Accordingly, the upper outer surface of the first cylindrical region, the second transition region and the second cylindrical region lies in the same plane. As noted above, the mounting end is formed to allow for the back face of the mounting end to be attached to the furnace via the inner wall or through the inner wall. From the mounting end, the first transition region begins. This first transition region serves to connect the mounting end of the panel to the first cylindrical region of the panel thereby transitioning from the outer surface shape of the mounting end to the actual cylindrical shape of the first cylindrical region. This first transition is an important aspect of the present invention, not only with regard to size and shape, but also with regard to the position of the discharge and of the panel in the furnace. This first transition region functions to permit a change in angle of the panel with regard to the furnace wall. As the transition extends from the mounting end towards the first cylindrical end, the angle of the upper outer surface of the transition region changes with regard to the upper outer surface of the mounting end. More specifically, the upper outer surface of the mounting end can be said to have a 0 degree angle with regard to the horizontal of the furnace (e.g., a line having a 90 degree angle with regard to the vertical furnace wall) compared to the upper outer surface of the first transition region which can be said to have an about 35 to about 60 degree angle with regard to the horizontal of the furnace. It is this angle that allows for better positioning of the discharge end of the panel with regard to the metal melt and therefore for more accurate injection of the various products from the injection apparatus.

The next region in this first embodiment is the mid-region. In this particular embodiment, the mid-region comprises a first cylindrical region, a second transition region and a second cylindrical region. It is within the mid-region that another important aspect with regard to this first embodiment is made known. This aspect involves the outer profile of the panel in the mid-region—more specifically, the overall change in the outer profile of the panel body between the first cylindrical region and the second cylindrical region. In this first embodiment of the burner/injector panel, the size of the outer profile in the mid-region of the panel body changes eccentrically through the second transition region—from the end of the first cylindrical region to the beginning of the second cylindrical region of the burner/injector panel. In addition, by utilizing such a configuration, it is possible to maximize the efficiency of the panel since it is possible to minimize the overall surface area and thereby minimize the heat intake of the panel as well as minimize the possibility of encountering furnace obstructions.

As used herein, the terms "eccentric" and "eccentrically" and all derivates thereof refer to the situation where when the edge of the outer profiles for two cylindrical objects residing in parallel offset planes share a single point of perceived contact as seen from a right angle view to either plane—the center point of the first outer profile will not be the same as the center point of the second outer profile. More specifically, it refers to the situation where two circles having differing diameters (in this particular case, the diameters of the first and second cylindrical region outer profiles), which are located in offset parallel planes, share a single point of contact that is tangential as seen from an orthogonal perspective to the parallel planes. As used herein, the term "orthogonal" refers to an orientation of and referring to right angles. Note that with regard to a bore that extends through the panel body, in the first cylindrical region the bore and the first cylindrical region do not share the same center line, but after the eccentric change in diameter in the second transition region, the bore and the second cylindrical region will then share the same center line.

It is through this eccentric increase, coupled with the transition of the first transition region, that the improvements of the present invention over the prior art panel apparatus are realized. More specifically, through the use of the two transition regions, it is possible to minimize the amount of surface area, which in turn maximizes the cooling efficiency due to the offset in heat intake (heat intake is directly proportional to surface area). In addition, by utilizing such a configuration, it is possible to increase the efficiency of the panel since the configuration allows for the injection of the various products from the inject apparatus closer to the metal melt line of the furnace since the configuration allows for the discharge end to be positioned deeper in the furnace (in furnaces with a split line to or past the split line and closer to the metal melt line and in furnaces with no split line at least 40% of the distance from the point where the bottom of the panel is in contact with the furnace wall to the metal line of the furnace).

The final region of the panel of the first embodiment is the terminating region. As noted, this region includes the discharge end of the panel from which the various products from the injection apparatus will be injected. This shape also presents another important aspect of the present invention since the terminating region is in the shape of a half spheroid which makes tangential contact at all points where it connects to the adjacent cylindrical region. By terminating the panel in a half spheroid, both the mass of the panel and the surface area are minimized. An additional benefit in using the half spheroid shape lies in the fact that by using a half spheroid, flashback is greatly minimized. Flashback damage is most powerful if delivered by a single reflection off the melt or scrap. Due to the half spheroid shape of the terminating region, the probability of a single reflection occurring with regard to the half spheroid shape, as compared to the standard flat end surfaces of the prior art panels, is less likely due to the ability of the half spheroid to reflect the single reflection off of the half spheroid without causing damage to the panel.

An additional benefit that is seen with regard to the present panel over prior art panels is that due to the configuration of the present panel, it is also possible to decrease the actual size of the panel compared to prior art panels. With regard to panels that protrude/extend into the furnace, the average panel is relatively large compared to the panel of the present invention. Accordingly, in the preferred embodiment of this present invention, the actual size of the mounting end of the panel will range from about 6 inches to about 10 inches in width and from about 11 inches to about 17 inches in height, with the dimensions of the remaining part of the panel ranging from about 5 inches to 10 inches in width at it's broadest section (as measured from the end of the first transition region to the end of the terminating region) from about 8 inches to 38 inches in length (as measured in line with the apparatus bore from the beginning of the first transition region to the end of the terminating region along the longest length). Preferably the size of the mounting end will be from about 6 inches to about 8 inches in width and from about 11 inches to about 13 inches in height. Preferably the size of the remaining part of the panel being from about 4.5 to about 8.5 inches in width at it broadest section (as measured from the end of the first transition region to the end of the terminating region) and from about 25 inches to about 30 inches in length (as measured in line with the apparatus bore from the beginning of the first transition region to the end of the terminating region along the longest length). Because of this change in configuration, the panel apparatus of the present invention has typically less than approximately 80% of the mounting surface area of prior art panel apparatus, more preferably less than 50% of the mounting surface area of the prior art panel apparatus and even more preferably, about 25% of the mounting surface area of the prior art panel apparatus. Also because of this change in configuration, the panel apparatus of the present invention is typically less than approximately 50% of the weight of prior art panel apparatus, more preferably less than 40% of the weight of the prior art panel apparatus and even more preferably, about 30% of the weight of the prior art panel apparatus.

In a second embodiment of the burner/injector panel of the present invention, the panel is the same as the first embodiment with the exception of the mid-region of the panel. More specifically, in this second embodiment, the mid-region comprises only a first cylindrical region. With regard to this embodiment, the shape of the outer profile of the mid-region of the panel does not change from one end of the mid-region to the other end of the mid-region. In other words, the shape of the outer profile remains constant throughout the mid-region with the only transition in the panel occurring between the mounting end of the panel and the mid-region of the panel as discussed hereinbefore—the transition that occurs in the first transition region.

The burner/injector panel of the present invention can be made using any casting or molding method known in the art provided that the final product comprises a solid, continuously cast or formed piece. As used herein, the phrase "solid, continuously cast or formed piece", or any variation thereof used herein with regard to the burner/injector panel such as "solid, continuously formed piece" or "solid, continuously cast piece" or "solid cast piece" or "solid formed piece" means that the burner/injector panel does not include multiple individual pieces that are joined together in a manner such as by welding or the use of securing means such as clamps, and/or brackets and the like in order to form the one piece. In addition, "solid, continuously cast or formed piece" or its other variations as noted above also does not refer to a formation where the burner/injector panel is formed then penetrated, pierced or infiltrated in any manner in order to further finish the piece such as for instance by drilling holes into the piece to remove sand from a sand cast molding. The burner/injector panel should instead be a single piece that is formed by the pouring of a material in to a cast or mold. More specifically, the burner/injector panel is a single piece that is formed by the pouring of copper in to a cast or mold. Note however, that the phrase "solid, continuously cast or formed piece" does not preclude making holes in the back face of the mounting end in order to provide a means to attach the panel to the furnace. More specifically, means such as threaded holes may be made in the back face of the mounting end in order to allow for the panel to be secured either to the inner wall of the furnace through bolts attached to a mounting plate or to be secured to some degree within the wall of the furnace using a mounting plate.

Also, for the purposes of the present invention, "solid, continuously cast or formed piece" does not preclude the casting or molding of the panel utilizing pipes in order to form one or more bores or cooling circuit paths within the panel as discussed below. While the burner/injector panel of the present invention is said to be "solid", this use of the term solid is in reference to the continuously cast or molded piece that forms the panel. It is noted that the formed piece will also include one or more bores that extend from one end to the other end of the burner/injector panel. These bores are not added after the casting of the piece, but are instead included at the time that the piece is cast or molded (they are formed as a part of the panel as the panel is cast or molded).

These bores are included for housing one or more injection apparatus and are positioned in the burner/injector panel through the use of procedures such as pipe core casting. By using pipe core casting, it is possible to extend the life of the burner/injector panel since this allows for the elimination of processes such as welding. It is well known that processes such as welding of burner/injector panel pieces often leads to weaknesses in the body of the panel which have the potential to create safety hazards when the panel is exposed to the furnace environment. This is due to welding failure which could result in water from the water-cooled circuit entering into the steel making process. In the pipe core casting process, the material from which the panel will be formed is poured into the mold which includes one or more pipes positioned at the site where the bores are desired. The pipe then becomes an integral part of the final piece. In the preferred embodiment of the present invention, the pipe will also be made of copper like the panel, preferably a high purity copper.

With regard to the one or more bores disposed within the burner/injector panel for receiving the one or more injection apparatus, in the preferred embodiments, the one or more bores will run parallel to the upper outer surfaces of the first transition region and mid-region of the burner/injector panel which forms a linear line as seen from the side view. The actual inner configuration of these bores will be completely dependent upon the upper outer surface of the noted regions and the injection apparatus that will be positioned within the bores. Accordingly, the apparatus utilized in the present invention may include any of the apparatus that are known in the art of burner/injector panels. The injection apparatus that are typically associated with burner/injector panels include, but are not limited to thermal energy sources such as burners, particulate injectors for injecting particulate matter such as carbon and the like, oxygen injectors for injecting oxygen or air or mixtures of oxygen and air or apparatus which allow for the combination of one or more of these (e.g., combinations of burners and injectors). The injector utilized may be any type of injector known in the art, for example, including but not limited to lances, supersonic lances, particulate injectors, post combustion apparatus and the like. In the preferred embodiment, the apparatus is selected from a thermal energy source such as an oxy-fuel burner, a particulate injector which injects a particulate such as carbon, and an oxygen injector that injects a gas that mainly comprises oxygen or air. In the most preferred embodiment, the injection apparatus is an oxygen injector wherein the gas used is pure oxygen. The bores for the injection apparatus will extend through the entire panel—through the mounting end, the first transitional region, the one or more regions of the mid-region and terminating region of the panel thereby allowing the product to be injected (by mean of the injection apparatus) into the furnace through the discharge end of the terminating region of the panel. In one embodiment of the present invention, the apparatus to be positioned or disposed within the bore is an oxygen injector. In still another embodiment, there are multiple bores in the burner/injector panel. In one such embodiment, there is an oxygen injector and a particulate injector disposed within one bore. In still another embodiment, there is an oxygen injector and a thermal source disposed within one bore. In still another embodiment of the present invention, there are two bores, with one bore having an oxygen injector disposed therein and the other having a particulate injector or a burner disposed therein.

Note that depending upon the furnace, in some situations the furnace will include more than one panel apparatus. Therefore, for example, the furnace could include a first panel apparatus which includes a panel having one bore disposed therein which houses a particulate injector, a second panel apparatus which include a panel having one bore disposed therein which houses an oxygen injector and a thermal source and a third panel apparatus which includes a panel having two bores, one bore which houses an oxygen injector and a thermal source and another bore which houses a particulate injector. Those of ordinary skill in the art recognize that any number of different combinations of panels, including one or more panels which have one or more bores which each house one or more injection apparatus may be used in a furnace and is often determined based on the type of furnace and the design of the overall furnace.

In the preferred embodiments of the present invention, the burner/injector panel will be fluid cooled, preferably water-cooled, using a fluid cooling circuit capable of surviving the hostile environment of the electric arc furnace and designed to be included within the furnace without any substantial changes in structure to the furnace. Optimization of the cooling of the panel is achieved by providing a design which uses a standard fluid cooling circuit that covers the panel as completely as possible. Optimization of the cooling of the panel is also achieved by reducing as much as possible the exterior surface area of the burner/injector panel in order to minimize the heat intake from the environment and minimize the mass that needs to be cooled. This in turn functions to aid the cooling circuit. As is the case with the inclusion of the bores, the cooling circuit is introduced into the panel when the panel is cast or molded. In other words, the panel is cast around the cooling circuitry. Any fluid cooling circuit known in the art may be used in the present invention. While the cooling circuit may be formed of any type of material that will withstand the heat from the molten material used to cast the panel, the preferred material for the fluid cooling circuit will also be the same material from which the panel is cast—copper, preferably high purity copper. Typically, in order to maximize cooling efficiency, the fluid cooling conduits will be located just inside the periphery of the panel following the overall shape of the panel. In addition, the panel will also include a plurality of fluid cooling conduits that surround the apparatus bore that is formed through the panel. In embodiments including multiple bores, that house additional injection apparatus may also be shrouded by a water cooling circuit along the sides of the additional bores.

The configuration of the present burner/injector panel allows for the burner/injector panel apparatus to be positioned in the furnace in such a manner as to permit for the panel to extend not only outward from the furnace wall into the furnace but also with regard to those furnaces that include a split line, for the discharge end of the burner/injector panel to extend outward from the furnace wall and downward to, or slightly below, the split line of the furnace. In these particular furnaces, to or slightly below refers to the final position of the discharge end of the panel relative to the point where the bottom surface of the panel contacts (or intersects) the inner surface of the furnace wall and the metal line of the furnace. More specifically, the phrase "slightly below" refers to extension of reach of approximately 40% of the distance from the point where the bottom of the panel is in contact with or intersects the inner surface of the furnace wall to the metal line, preferably to a reach of approximately 50% of the distance, even more preferably to a reach of approximately 60% of the distance.

In those embodiments where there is no split line in the furnace, the burner/injector panel apparatus is positioned in the furnace in such a manner as to allow for the panel to extend not only outward from the furnace wall into the furnace but also over the refractory bricks and towards the metal line of the furnace. More specifically, in this particular embodiment, the discharge end of the panel extends to a reach of approximately 40% of the distance from the point where the bottom of the panel is in contact with or intersects the inner surface of the furnace wall to the metal line, preferably to a reach of approximately 50% of the distance, even more preferably to a reach of approximately 60% of the distance.

When the burner/injector panel is mounted on the furnace wall, the discharge end will extend away from the furnace wall at an angle that will generally range from about 35 to about 65 degrees from the horizontal, preferably from about 35 to about 55 degrees from the horizontal, and in the most preferred embodiments, generally from about 42 to 48 degrees from the horizontal. In many instances, the angle will be about 45 degrees from the horizontal. As used herein, the term "horizontal" refers to a line that extends from the discharge end of the panel and is parallel to the split line and metal line of the furnace. The specific configuration of the burner/injector panel and angle allows optimization of the discharge into the furnace from the discharge end of the terminating region because of its position with regard to the metal line of the furnace. Accordingly, the distance from the burner/injector panel to the molten metal or metal line is reduced. In those embodiments where the furnace includes a split line, the discharge end will extend to, or slightly below, the split line of the furnace. As used herein, the phrase "split line" refers to the region where the top shell of the furnace (that region that is typically water-cooled) meets and is attached to the bottom shell of the furnace (that region of the furnace that is typically comprised of refractory brick). See FIG. 4 for more detail. In the case where the furnace does not include a split line, this configuration allows for optimization by the extension of the discharge end outward from the furnace wall into the furnace, and over the refractory bricks and towards the metal line of the furnace. See FIG. 10 for more detail.

Due to the decreased size of the burner/injector panel of the present invention, in some embodiments it will be possible to mount the panel apparatus without any change to the existing furnace. In other embodiments, because of the structure of the furnace, it may be necessary to remove or modify the refractory bricks forming the shell of the furnace or in some furnaces, the bottom shell of the furnace, by creating a notch or indentation in the refractory bricks thereby forming a slight recess in the refractory bricks. Such modifications will also serve to further protect the burner/injector panel apparatus due to the slight degree of shielding afforded by the recess. In these instances, the burner/injector panel apparatus can be mounted using any of the standard manners for such panel apparatus. In many furnaces, there is also included a "brick step" that extends inward from the bottom shell where the upper shell of the furnace meets the bottom shell of the furnace. In such embodiments, this notch or indentation is often made in the actual brick step. In other instances, the brick step assists in the positioning of the panel within the furnace.

In still further embodiments of the present invention, where there is a space that exists between the burner/injector panel and the refractory brick or refractory step of the furnace, a ramable refractory material such as clay or any other refractory material that can be fired and is not combustible can be used to fill this space. Such materials are commonly used in electric arc furnaces and are readily known by those skilled in the art. In a still further embodiment, the burner panel is constructed to fit within a pre-existing slot for a burner panel. The burner panel is typically adapted to utilize furnace panel attachment means, such as bolts, clamps, screws, nails, lugs, wedges and/or the like. Preferably, lugs and wedges are utilized. Those of ordinary skill in the art will recognize whether such modifications are necessary are dependent upon the type of furnace in which the panel apparatus is to be used.

The present configuration allows for the actual injection of products such as oxygen and/or particulates as close as possible to the molten metal/metal line. The shape of the panel allows for the injection apparatus to be protected while at the same time bringing the actual product to be injected close to the molten metal/metal line.

Furthermore, the upper surface of the transition region of the burner/injector panel of the present invention optionally contains shaped grooves. In the alternative, the entire upper surface of the burner/injector panel of the present invention contains shaped grooves. The grooves may be present in any number of sizes and shapes, including but not limited to V-shaped, U-shaped, diamond-shaped, square-shaped, round-shaped, oval-shaped and the like or a combination of any of these shapes. The shaped grooves unexpectedly and advantageously channel a flow of slag. In various embodiments, the channeled slag is capable of forming an at least partially solidified layer on the burner/injector panel thereby providing additional protection to the burner/injector panel. However, in other embodiments, the slag will remain in a liquid state or a nearly liquid state. In embodiments with an at least partially solidified layer of slag on a surface of the burner/injector panel, the slag is capable of at least partially insulating the burner/injector panel apparatus, thereby at least one of protecting the burner/injector panel from damage and/or increasing the service life of the burner/injector panel. Likewise, liquid slag provides a limited measure of insulation. As used herein, the term "slag" means and refers to the glass-like mass left as a residue by the smelting of metallic ore. The production of a correct slag composition from the iron carbon melt during the refining phase is important in achieving the desired steel chemistry and in removing impurities from the melt. In a furnace, slag typically exists both in a liquid state and a solid/semi-solid state.

The variety of improved features and/or enhanced characteristics of the various embodiments of the burner/injector panel apparatus of the present invention include at least one of a) decreased distance from the discharge end of the burner/injector panel to the molten metal/metal line; b) streamlining in design over prior art panels thereby resulting in increased savings for manufacturing due to less material being used; c) energy savings; d) improved burner/injector panel efficiency due to the burner/injector being closer to the molten metal line; e) improved fluid cooling efficiency of the burner/injector efficiency due to minimization of surface area to be fluid cooled; f) a general reduction in burner/injector panel failure, including failure of the one or more injection apparatus, g) a general reduction in safety hazards since the burner/injector panel comprises one solid cast or molded piece and h) optimization of the discharge surface, thereby decreasing the possibility of damage occurring due to flashback.

Because the burner/injector panel apparatus of the present invention extends out from the furnace wall and in some instances through and/or over the refractory brick step, the at least one bore is closer to the surface of the metal melt/metal line. Likewise, in some embodiments such as the second embodiment noted above, it is possible to have the apparatus bores closer to the center of the furnace thereby providing in some instances increased efficiency.

Various embodiments of the present invention have wide applicability across the art field for providing enhanced and/or improved burner/injectors for furnaces and related methods of use. This disclosure will discuss application of the improvements of the present invention as it relates to furnaces primarily in the field of steel making. However, one of ordinary skill in the art would be able to readily apply the technology across all furnace technologies and the particular embodiments herein described should not be read as limiting on the full scope of this patent specification and the appended claims.

Figure 1:
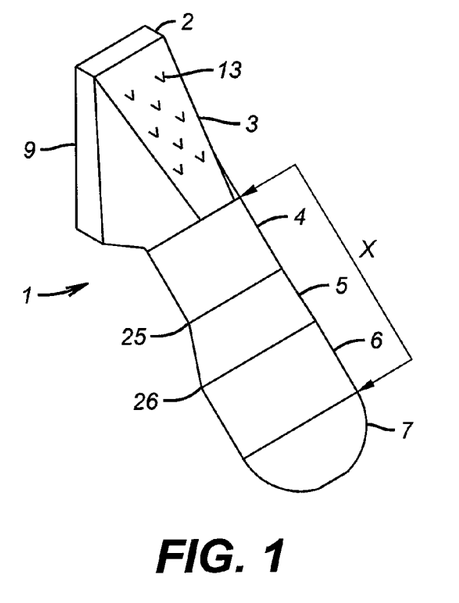
FIG. 1 provides an illustration of a front isometric perspective view of the burner/injector panel of the present invention.
Figure 3:
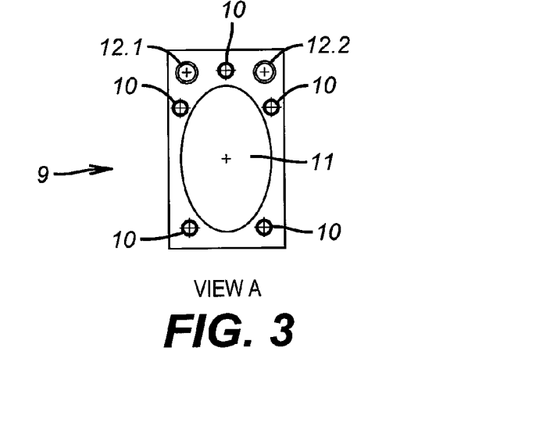
FIG. 3 provides an illustration of the back face view of the rectangular mounting end of the burner/injector panel of FIG. 2 of the present invention.
Figure 4:
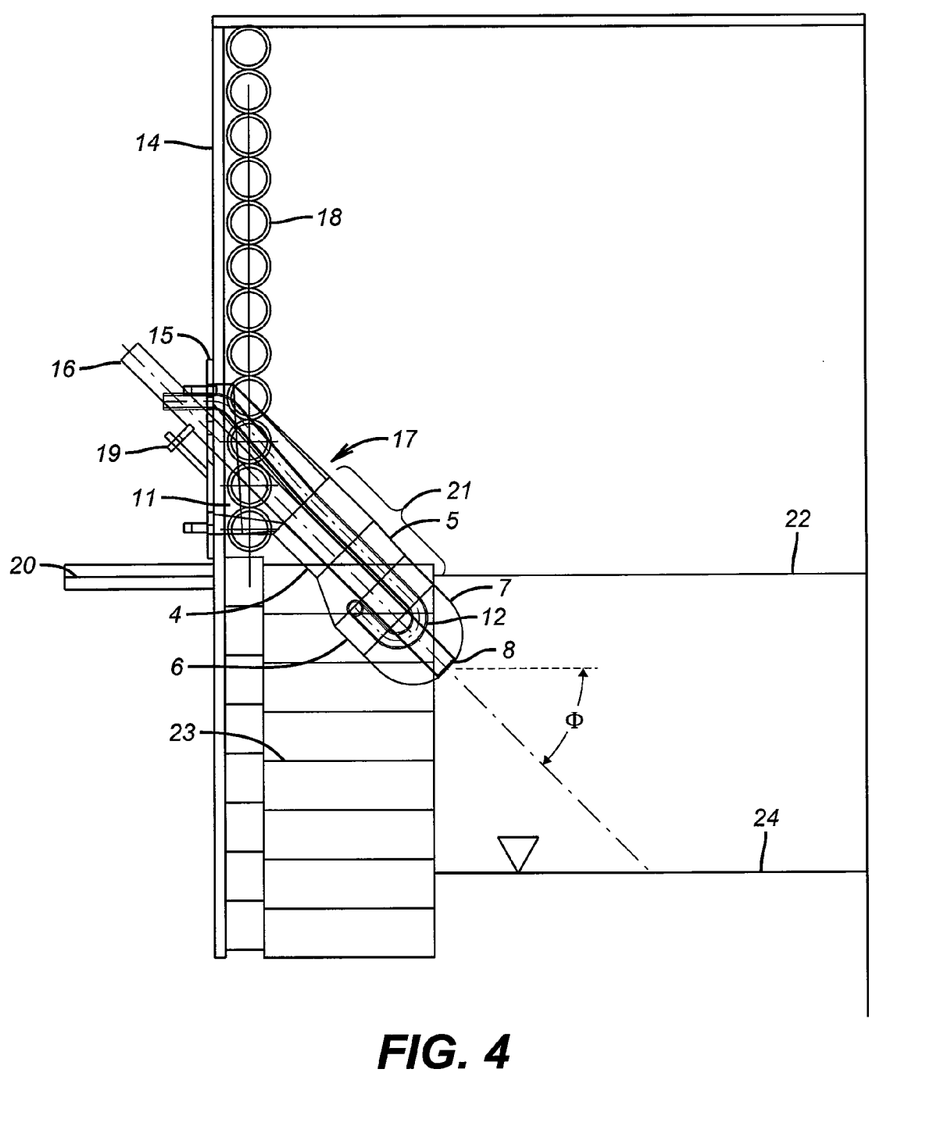
FIG. 4 provides a cut away cross-sectional view of a burner/injector panel apparatus of the present invention that is attached to a furnace wall.

A greater understanding of the present invention may be had with reference to a detailed description of the Figures which exemplifies at least two embodiments of the present invention. However, these embodiments are in no way intended to limit the present invention. FIGS. 1 to 4 depict the first embodiment of the present invention. FIG. 1 provides a front isometric perspective view of one embodiment of the burner/injector panel 1 of the present invention. As shown in FIG. 1, this particular burner/injector panel 1 comprises a mounting end 2, a first transition region 3, a mid-region in the form of a first cylindrical region 4, a second transition region 5, and a second cylindrical region 6, and a terminating region 7. The mounting end 2 of the burner/injector panel 1 is typically in a rectangular form and includes a back face 9. As further shown in FIG. 3, this back face 9, which is positioned away from the main portion of the burner/injector panel 1, is adapted to allow for the mounting of the burner/injector panel 1 to the inside of the wall 14 of a furnace as shown in FIG. 4. More specifically, as shown in FIG. 3, the back face 9 of the mounting end 2 includes a means for attaching the panel 1 to a furnace wall. Typically, as shown in FIG. 3, this means comprises threaded holes 10 for mounting bolts or screws to allow for the attachment of the mounting end 2 to the furnace wall 14. As further evidenced in FIG. 2, which provides a cut-away side view of the embodiment exemplified in FIG. 1, in the first transition region 3, the panel 1 begins its first transition from the shape and size of the mounting end 2 to the form of the first transition region 3. In other words, for example, with regard to the first embodiment of FIG. 1 where the mounting end 2 is rectangular in shape, the mounting end 2 begins to transform from the rectangular shape of the mounting end 2 into a relatively cylindrical outer profile shape by the final portion of the first transition section 3.

Figure 2:
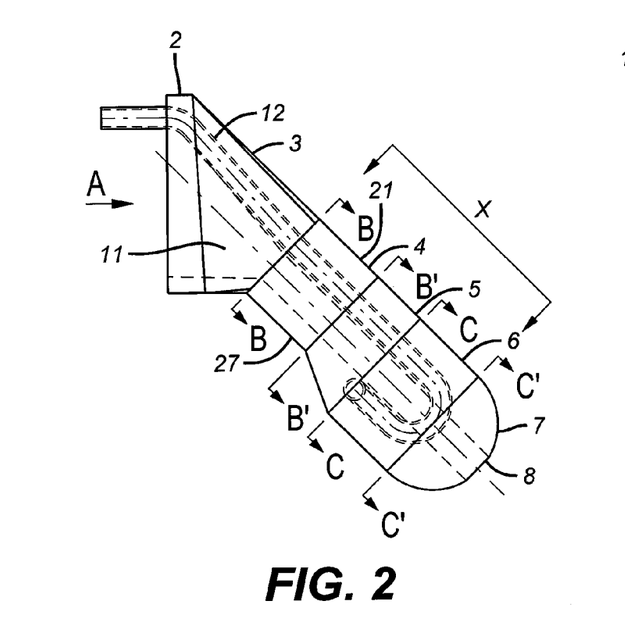
FIG. 2 provides an illustration of a cut away side perspective view of FIG. 1 of the burner/injector panel of the present invention.

As further shown in FIG. 2, the first transition region 3 is in fluid communication with the first cylindrical region 4 of the mid-region (in this particular embodiment, the mid-region comprising 4, 5, 6). The upper outer surfaces 21 of the first cylindrical region 4, the second transition region 5, and the second cylindrical region 6 each lie in the same plane (see FIG. 1, line X). The first cylindrical region 4 of the mid-section 4, 5, 6, unlike the first transition region 3, does not include a transition in terms of the size and shape of the outer profile but instead has an outer profile that remains constant throughout the first cylindrical region 4 (see B-B to B'-B' of FIG. 2). This first cylindrical region 4 is in fluid communication with the second transition region 5 of the panel 1. It is at this point in the panel 1 that the panel 1 begins a second transition with regard to the size and shape of the outer profile of the panel 1. More specifically, it is at this point that the panel transitions in an "eccentric" manner as defined hereinbefore compared to the transition of the first transition region 3. As defined hereinbefore, what is meant by eccentric with regard to this second transition region 5 in this first embodiment of the present invention is that when the outer profiles of the beginning of the second transition region 5 (as marked by the line B'-B' in FIG. 2) and the end of the second transition region 5 (as marked by the line C-C in FIG. 2) share a single point of contact in the outer profile as seen from a perspective orthogonal view of the second transition region 5 (the outer upper surface 21 of the panel between B'-B' and C-C). The centerline that runs through the center of the profile of cylindrical region 4 will not be colinear with but will be parallel to the centerline that runs through the center of the profile of cylindrical region 6. The differing profiles as depicted respectively by the beginning of the second transition region 5 marked by the line B'-B' and by the end of the second transition region 5 marked by the line C'-C' that are located in offset parallel planes and the diameters of these circles depicting the exterior or outer profile of the panel marked by B'-B' and C'-C' share a single point of contact which is tangential as seen from an orthogonal perspective to these parallel planes. Note that the upper outer surface 21 of the first cylindrical region 4, second transition region 5 and second cylindrical region 6 is the vertical most surface of each corresponding region and this outer surface 21 forms a straight line. The outer surface 21 corresponds to line X of FIG. 1. All transition changes in the second transition region occur below the outer surface 21 (along the bottom surface 27 of the panel).

Figure 5:
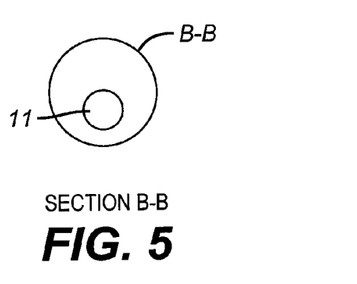
FIG. 5 provides a cut away view of outer and inner profiles which are not concentric.
Figure 6:
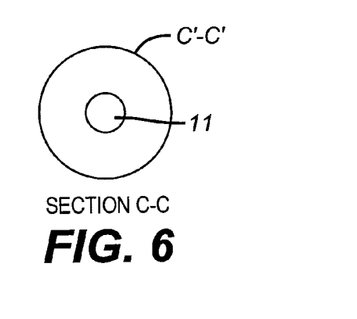
FIG. 6 provides a cut away view of outer and inner profiles which are concentric.

Furthermore, due to this transitional change in the second transition region 5, as further shown in FIG. 2, the section of the bore 11 located in the first cylindrical region 4 does not share the same center point as the outer profile of the first cylindrical region 4. Reference is made to FIG. 5 to show a cross section view including the bore 11 and the outer profile of the first cylindrical region 4 as represented by line B-B of FIG. 2. However, after the eccentric transition in the second transition region 5, the cross section view of the panel changes such that the section of the bore 11 located in the second cylindrical region 6 will share the same center point as the outer profile of the first cylindrical region 6. Reference is made to FIG. 6 that shows a cross section view including the bore 11 and the outer profile of the second cylindrical region 6 as represented by line C'-C' of FIG. 2. Due to these transitions in the first and second transition regions 3, 5, the bore 11 is now in alignment with the discharge end 8 of the terminating region 7. Further with regard to FIG. 4, when the burner/injector panel apparatus is mounted inside a furnace, the discharge end 8 of the panel 1 extends into the furnace toward the metal line/melt line 24 at an angle that ranges from about 35 degrees to about 60 degrees, preferably about 45 degrees, from the horizontal (the line that extends from the discharge end 8 of the panel 1 and is parallel to the split line 22 and/or metal line 24 of the furnace). This angle is depicted by the symbol Φ in FIG. 4.

As noted previously, the terminating region 7 is in the form of a half spheroid shape with the portion of this spheroid shape opposite the second transition region 6 being referred to as the discharge end 8 of the terminating region 7 of the burner/injector panel 1. The bore 11 of the panel 1 is a hollow cavity which is often in the shape of a tube that is open at the mounting end 2 to allow for the insertion of the one or more injection apparatus 16 and also open at the discharge end 8 thereby allowing for the injection of products (oxygen, oxy-fuel, etc) from the injection apparatus 16 that is positioned in the bore 11 of the panel 1.

As further shown in FIG. 2, the burner/injector panel apparatus includes a bore 11 that traverses the mounting end 2, the first transition region 3, the first cylindrical region 4, the second transition region 5, the second cylindrical region 6, and the terminating region 7. The angle of the bore 11 within the burner/injector panel 1 is such that the bore 11 runs parallel with the upper surface 21 that encompasses the first cylindrical region 4, the second transition region 5, and the second cylindrical region 6 (as depicted by line X). Furthermore, as previously noted, the bore 11 is concentrically located within the second cylindrical region 6 (see FIG. 6). With reference back to FIG. 1, in the invention of the present application, the second transition region 5 has a first outer profile line 25 (noted as line B'-B' in FIG. 2) and a second outer profile line 26 (noted as line C-C in FIG. 2). The first outer profile line 25 of the second transition region 5 mates with one end of the first cylindrical region 4 and the second outer profile line 26 mates with one end of the second cylindrical region 6 which because of the bore 11 disposed therein makes all regions in fluid communication. With regard to the surfaces of the first and second cylindrical regions 4 and 6 respectively, as noted, the bore 11 is in linear alignment with the upper surface 21 of the first and second cylindrical regions 4, 6. Note that the shape of the bore 11 of the present invention can vary. In general, most bores are circular. However, bores may be of any shape, such as, but not limited to spherical, triangular, pentangular, hexangular, and/or the like structure.

As shown in FIG. 4, the injection apparatus 16 of the present invention will be positioned in the bore 11 of the burner/injector panel 1 of the burner/injector panel apparatus of the present invention. The shape of the bore 11 will be dependent upon the actual injection apparatus 16 utilized as well as the number of injection apparatus 16 to be positioned in one bore 11. As noted previously, more than one bore 11 may be present in the burner/injector panel 1. As is the case when one bore 11 is included, all of the bores 11 must run parallel or in linear alignment to the upper surface 21 of the first cylindrical region 4, the second transition region 5, and the second cylindrical region 6.

Figure 7:
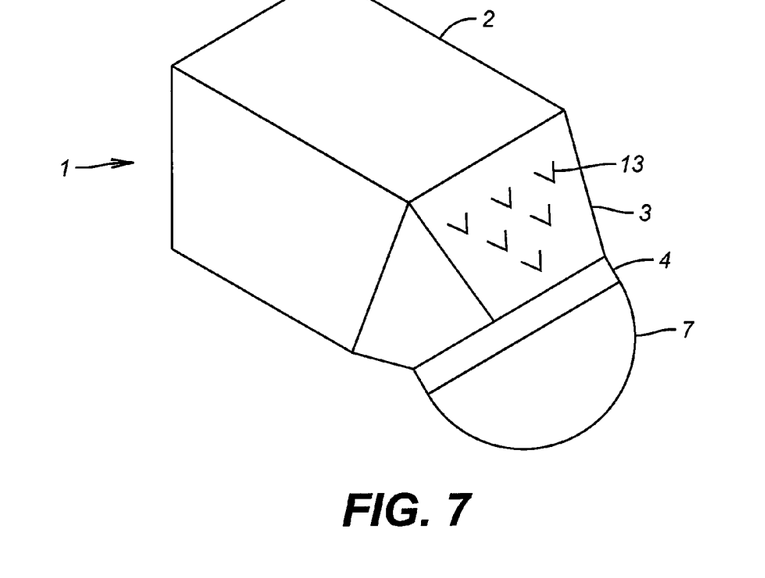
FIG. 7 provides an illustration of a front isometric perspective view of an alternative embodiment of the burner/injector panel of the present invention.
Figure 8:
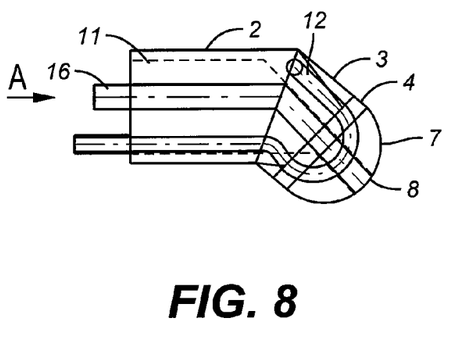
FIG. 8 provides an illustration of a cut away side perspective view of the alternative embodiment of the burner/injector panel of FIG. 7 of the present invention.
Figure 9:
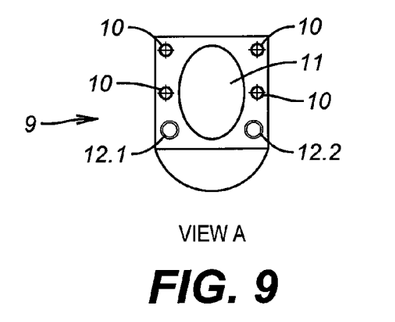
FIG. 9 provides an illustration of the back face view of rectangular mounting end of an embodiment of the burner/injector panel of FIG. 8 of the present invention.
Figure 10:
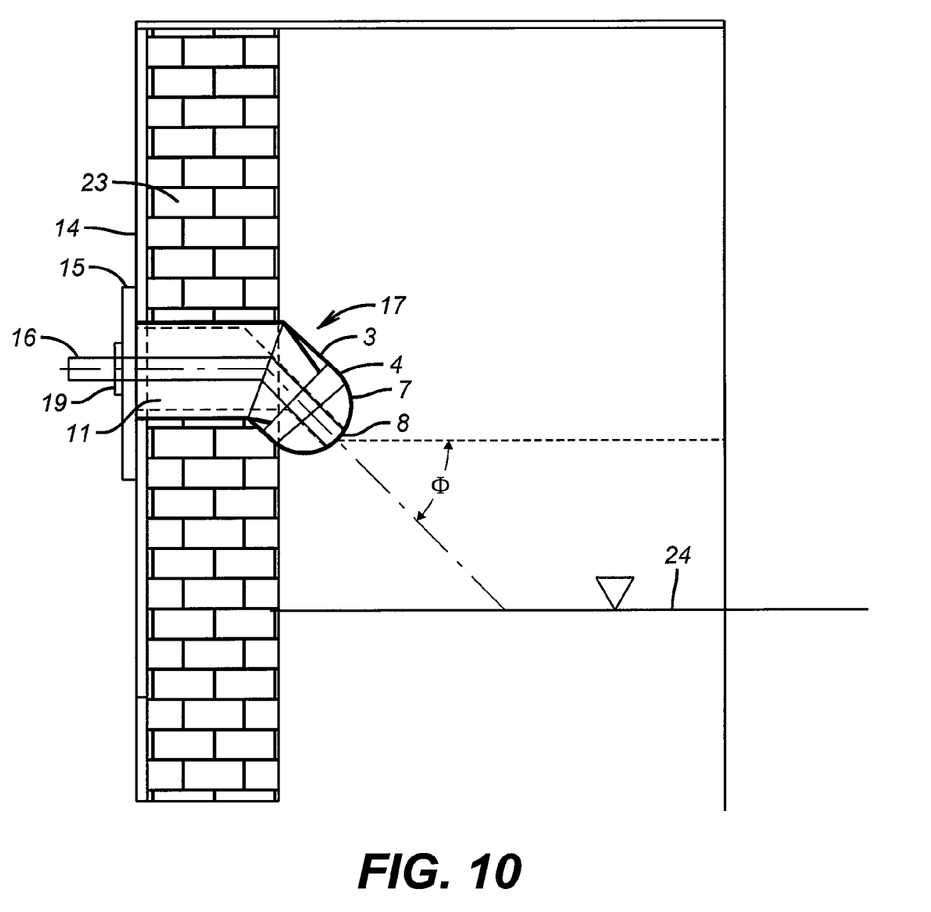
FIG. 10 provides a cut away cross-sectional view of an alternative embodiment of the burner/injector panel apparatus of the present invention that is attached to a furnace wall.

The second embodiment of the present invention is shown in FIGS. 7 to 10. FIG. 7 provides a front isometric view of an alternative embodiment of the burner/injector panel 1 of the present invention. In this particular embodiment, the burner/injector panel 1 comprises a mounting end 2, a first transition region 3, a mid-region in the form of only a first cylindrical region 4, and a terminating region 7. The mounting end 2 of the burner/injector panel 1 in this particular embodiment may be in the form of a rectangular or a square (as shown in FIGS. 7 and 9) and includes a back face 9 which is positioned away from the main portion of the burner/injector panel 1 and is adapted to allow for the mounting of the burner/injector panel 1 to a furnace wall. In this particular embodiment, the panel 1 is designed to be included in a furnace that includes a thick wall 14 of furnace brick or refractory brick 23. Accordingly, the mounting end 2 of this particular embodiment includes a mounting end 2 which is thicker in depth than the flatter version of the mounting end 2 shown in the first embodiment of the present invention as discussed hereinbefore. More specifically, as shown in FIG. 10, the mounting end 2 is sufficient in depth to allow the mounting end 2 to traverse the full extent of the furnace brick or refractory brick 23 of the furnace wall 14. Accordingly, while the preferred overall shape of the mounting end 2 will be rectangular or square, the depth of this mounting end 2 (from the front of the mounting end 2 to the back face 9) will often be dependent upon the thickness of the wall 14 of the furnace where the panel 1 is to be installed. Note that with regard to this particular embodiment, the mounting end 2 is actually positioned in the wall 14 of the furnace. Accordingly, with regard to this embodiment, reference to mounting on the furnace wall 14 will also encompass mounting through the furnace wall in those furnaces that do not include a split line and which include thick walls.

As in the first embodiment of the present invention, in this second embodiment, the back face 9 of the mounting end 2 as shown in FIG. 9, includes threaded holes 10 for mounting bolts or screws which allow for the attachment of the back face 9 of the mounting end 2 to the furnace wall 14. As further evidenced in FIG. 8 which provides a cut-away side view of the embodiment exemplified in FIG. 7, in the first transition region 3, the panel 1 begins its first transition from the shape and size of the mounting end 2 to the form of the first transition region 3. More specifically, for example with regard to the second embodiment where the mounting end 2 is square in shape, the mounting end 2 begins to transform from the square shape of the mounting end 2 into a relatively cylindrical outer profile shape of the final portion of the first transition section 3 which corresponds to the first cylindrical region 4.

Further with regard to FIG. 10, when the burner/injector panel apparatus is mounted inside a furnace, the discharge end of the panel 1 extends into the furnace toward the metal line/melt line 24 at an angle that ranges from about 35 degrees to about 60 degrees, preferably about 45 degrees, from the horizontal (the line that extends from the discharge end 8 of the panel 1 and is parallel to the metal line 24 of the furnace). This angle is depicted by the symbol Φ in FIG. 10.

As shown in this embodiment, this first transition region 3 is in fluid communication with the first cylindrical region 4 which is in fluid communication with the terminating region 7 of the panel 1. The first cylindrical region 4, unlike the first transition region 3, does not include a transition in terms of the size and shape of the outer profile but instead has an outer profile that remains constant through out the region of the first cylindrical region 4.

As noted previously, the terminating region 7 is in the form of a half spheroid shape with the exterior portion of this spheroid shape (the portion facing the metal melt) being referred to as the discharge end 8 of the terminating region 7 of the burner/injector panel 1. As in the first embodiment, in the second embodiment, the bore 11 of the panel 1 is a hollow cavity which is often in the shape of a tube that is open at the mounting end 2 to allow for the insertion of the one or more injection apparatus 16 and also open at the discharge end 8 thereby allowing for the injecting of the products (oxygen, oxy-fuel, etc) from the injection apparatus 16 that is positioned in the bore 11 of the panel 1.

As further shown in FIG. 8, the burner/injector panel apparatus includes a bore 11 that traverses the mounting end 2, the first transition region 3, the first cylindrical region 4, and the terminating region 7. In this particular embodiment, rather than include a second transition region and in order to accommodate for the depth of the mounting end 2, the bore itself transitions in the first transition region of the panel in order to accomplish the positioning of the discharge end and the ultimate delivery of the product(s) from the one or more injection apparatus 11 at the discharge end 8. In one preferred embodiment (not shown in the Figures), the end of the injection apparatus 16 will be flush with the end of the terminating region 7. Note that the bore 11 in the panel 1 of FIG. 8 is not straight. In this particular embodiment, the bore 11 and injection apparatus 16 will require a bend along their length such that the discharge of the injection apparatus 16 from the panel apparatus will be approximately aligned with the end of the termination region 7. As with the previous embodiment, in this particular embodiment, the angle of the bore 11 within the burner/injector panel 1 is such that the bore 11 runs parallel with the upper surface 21 of the mid-region—in this case the first cylindrical region 4.

As with the first embodiment, the shape of the bore 11 can vary. As shown in FIG. 10, the injection apparatus 16 of the present invention will be disposed in the bore 11 of the burner/injector panel 1 of the burner/injector panel apparatus of the present invention. The shape of the bore 11 is dependent upon the actual injection apparatus 16 utilized as well as the number of injection apparatus 16 to be positioned in one bore 11. When the injection apparatus is included in the bore, an apparatus mounting bracket may also be included to help to hold the one or more injection apparatus in place.

Regardless of the configuration of the panel 1, the burner/injector panel apparatus to be mounted in a furnace is generally a fluid cooled, preferably water-cooled, burner/injector panel 1 (see FIG. 2 and FIG. 8) having at least one bore 11 (as depicted in FIGS. 2, 3, 8 and 9) and at least one injection apparatus (16 as shown in FIGS. 4 and 10). As further shown in FIGS. 4 and 10, the burner/injector panel apparatus will typically be mounted on the furnace wall 14 utilizing the means for attaching the panel 1 to the wall 14 that is located on the back face 9 of the mounting end 2. While any number of means are available for attaching the burner/injector panel to a furnace wall 14 such as lugs and drill drifts, hooks, brackets, threaded or welded connecting mechanisms, typically the panel 1 will be mounted to the furnace wall 14 utilizing a mounting plate 15 as shown in FIGS. 4 and 10. In those instances where the furnace includes a furnace split 20 as in FIG. 4, the mounting plate 15 may abut the top of the top course of refractory for added support. Once the panel 1 is mounted to the furnace wall 14, the injection apparatus 16 may be inserted into the bore 11 and further secured through the use of the injection apparatus mounting bracket 19. By configuring the bore 11 in such a way, this also has the added benefit of allowing the injection apparatus 16 to be exchanged/altered/worked on without having to remove the entire panel 1 from the furnace wall 14. All that is necessary to remove the injection apparatus 16 is to remove the mounting bracket 19 to allow the removal of the injection apparatus 16.

During the operation of the furnace, slag inside the furnace exists in at least two states, liquid and solid. As the slag boils, pops, expands, and/or the like, at least a portion of it will contact a surface of the burner/injector panel 1. While as a liquid the slag offers a degree of protection to the burner/injector panel, in the solid state, generally the slag offers far more protection to the burner/injector panel 1. Accordingly, further embodiments of the burner/injector panel 1 will include one or more shaped grooves 13 on the upper outer surface 21 of the first transition region 3 of the burner/injector panel 1 as shown in FIGS. 1 and 7. In still further embodiments, the shaped grooves 13 will be on the upper outer surface 21 of the first transition region 3 and mid-region 4 or 4, 5, and 6 (not shown). The one or more shaped grooves 13 may be any number of different shapes as discussed hereinbefore, including V-shaped grooves. In still even further embodiments, multiple groove shapes may also be present (not shown). When the grooves 13 are present, they will typically be oriented along the upper transition surface 21 of the burner/injector panel 1 but may also be on the upper area of the terminating region 7. In the embodiment where the grooves 13 are located along the outer upper surface 21 of the first transition region 3, the grooves 13 act to channel slag along the first transition region 3 of the burner/injector panel 1. The grooves 13 channel the flow of the slag such that the slag is capable of forming an at least partially solidified layer about the burner/injector panel 1. The at least partially solidified layer of slag on the panel 1 is capable of at least partially insulating the burner/injector panel 1, thereby protecting the burner/injector panel 1 from damage and/or increasing the service life of the burner/injector panel 1. The same holds true with regard to the grooves 13 on different regions of the panel 1.

The burner/injector panel 1 of the burner/injector panel apparatus 17 will also further comprise a fluid cooling system comprising a fluid cooling circuit 12 as shown in FIGS. 2, 4, and 8, the system having at least one fluid cooling circuit 12 disposed within the burner/injector panel 1 and in approximate axial alignment with the bore 11 that houses the injection apparatus 16. As noted previously, preferably the fluid cooling system is a water cooling system. As further shown in FIGS. 3 and 9, the back face 9 of the mounting end 2 will include an inlet and outlet means 12.1, 12.2 respectively for fluid to be injected into the fluid cooling circuit 12. In each of the embodiments discussed hereinbefore, the fluid cooling circuit 12 preferably takes on a path or route that is non-linear in shape and conforms to the shape of the burner/injector panel 1 as shown in FIGS. 2 and 8. Typically, in order to maximize cooling efficiency, the fluid cooling conduits 12 are located just inside the periphery of the panel 1 going along the shape of the panel 1. In addition, the panel 1 may also include a plurality of fluid cooling conduits 12 that surround the at least one bore 11 that is formed through the panel 1 in order to provide additional cooling efficiency.

While not shown in great detail in FIG. 4, but readily understood by those of ordinary skill in the art, the furnace typically will also include a water cooled furnace panel 18 positioned within the furnace wall 14 to assist in removing heat from the surface of the furnace wall 14 and to some degree from the burner/injector panel 1. As noted above, in various embodiments, the burner/injector panel 1 has an independent fluid cooling system in the form of a fluid cooling circuit 12 but can also benefit from the water cooled furnace panel 18. Removing heat from the furnace wall 14 and/or burner/injector panel 1 can reduce the incidence of failure by cooling the burner/injector panel 1, injection apparatus 16 and the furnace. With regard to the fluid cooling circuit 12, generally, as the flow of fluid is increased through the fluid cooling circuit 12, the temperature of the burner/injector panel 1 is reduced or maintained. At the same time, generally as the flow of water is increased through the water cooled furnace panel 18, the temperature of the furnace wall 14 and burner injector panel 1 is also reduced or maintained. Maintaining or reducing the temperature of the burner/injector panel 1 and furnace wall 14 can allow for increased operational life of the overall equipment.

The structure of the burner/injector panel 1 of each of the embodiments set forth in the Figures herein has several advantages over conventional burner/injector panels. The primary advantage is that it provides a practical means for providing panels 1 for small furnaces (those with less than 40 tons capacity). Smaller scale plus minimized surface area also lead to efficiencies in terms of cost of production, heat intake/cooling and ability to protect the injection apparatus 16 while at the same time providing a decreased distance to the metal line 24 from a burner/injector panel 1 of the present invention. In the first embodiment, the burner/injector panel 1 of the present invention is capable of reaching at least to the split line 22 (where the upper and lower furnace shells meet). In alternative embodiments as shown in FIG. 4, the burner/injector panel 1 of the present invention extends beyond, over, and/or below the split line 22. In this particular embodiment, the apparatus extends below the furnace split line 22 and towards the metal line 24 thereby allowing for the injection of various products such as oxygen, oxyfuel or particulates from the one or more injection apparatus 16. In still further embodiments such as that demonstrated in FIG. 10 where the furnace does not have a split line, the burner/injector panel is still capable to reaching down past the furnace refractory brick 23 toward the metal line 24 of the furnace.

While the panel 1 of the present invention may be utilized in any number of different types of furnaces, the panel 1 is preferably utilized in an electric arc furnace and all of the flows of fuel, oxidizing gas and particulates pass through the panel 1 and are all substantially directed to the same location in the electric arc furnace. The directionality of the various flows allows the injection apparatus 16 to heat a localized spot of the slag/charge with thermal energy from the oxidation of the fuel, from the oxidation of oxidizable components in the slag or the melt by the lancing of supersonic oxidizing gas, and/or from any combination of these.

The present invention further provides for a method of injecting a product into a furnace from the burner/injector panel apparatus, the method comprising a first step of injecting at least product into a furnace from a burner/injector panel apparatus, the burner/injector panel apparatus comprising at least one apparatus bore 11 and at least one injection apparatus 16, wherein the burner/injector panel 1 extends outwardly from a furnace wall 14 at least to, or below, a split line 22 of the furnace and wherein the product is selected from auxiliary thermal energy, at least one particulate, oxygen or mixtures thereof.

The described embodiments are to be considered in all respects only as illustrative and not restrictive. The scope of the invention is, therefore, indicated by the appended claims rather than by the foregoing description. All changes to the claims which come within the meaning and range of equivalency of the claims are to be embraced within their scope. Further, all published documents, patents, and applications mentioned herein are hereby incorporated by reference, as if presented in their entirety.

LISTING OF ELEMENTS 1 burner/injector panel
2 mounting end
3 first transition region
4 first cylindrical region
5 second transition region
6 second cylindrical region
7 terminating region
8 discharge end of terminating region
9 back face of mounting end
10 means for attaching the burner/injector panel to a furnace wall
11 bore
12 water cooling circuit
13 grooves
14 furnace wall
15 mounting plate for burner/injector panel
16 injection apparatus
17 fluid cooled burner/injector panel apparatus (panel 1 with injection apparatus 16)
18 water cooled furnace panel
19 apparatus mounting bracket
20 furnace split
21 upper outer surface
22 split line of the furnace
23 furnace brick or refractory brick
24 metal line/melt line
25 outer profile line of the first cylindrical region
26 outer profile line of the second transition region
27 bottom surface of the burner/injector panel

What is claimed is:

1. A burner/injector panel apparatus to be mounted on the wall of a furnace that includes a furnace split line, a top shell and a bottom shell, said panel apparatus comprising:
   A) a burner/injector panel that has a first end and a discharge end and is formed in such a manner as to include (a) a mounting end as the first end; (b) a first transition region; (c) a first cylindrical region; (d) a second transition region; (e) a second cylindrical region; and (f) a terminating region as the discharge end;
   B) one or more bores that traverse the mounting end, the first transition region, the first cylindrical region, the second transition region, the second cylindrical region, and the terminating region of the burner/injector panel; and
   C) at least one injection apparatus selected from one or more of a thermal energy source, a particulate injector, or an oxygen injector; wherein the terminating region is in the shape of a half spheroid; the mounting end, the first transition region, the first cylindrical region, the second transition region, the second cylindrical region, and the terminating region of the burner/injector panel are in fluid communication with one another through the one or more bores that traverse the burner/injector panel; the first cylindrical region, the second transition region, and the second cylindrical region each include an upper outer surface that runs parallel to the one or more bores; the outer profile of the second transition region increases eccentrically from the first cylindrical region to the second cylindrical region; the at least one injection apparatus is positioned within the one or more bores; and the burner/injector panel when mounted on the furnace wall extends outward and downward from the furnace wall such that the discharge end of the burner/injector panel extends to, or below, the furnace split line and towards a metal melt line in the furnace.

2. The burner/injector panel apparatus of claim 1, wherein the burner/injector panel is a solid, continuously formed piece.

3. The burner/injector panel apparatus of claim 2, wherein the burner/injector panel extends at an angle from about 42 to about 48 degrees from the horizontal.

4. The burner/injector panel apparatus of claim 3, wherein the discharge end of the burner/injector panel extends to a reach of approximately 50% of the distance from the point where the bottom of the burner/injector panel is in contact with the furnace wall to the metal line.

5. The burner/injector panel apparatus of claim 1, wherein the discharge end of the burner/injector panel extends at an angle from 35 degrees to 65 degrees from the horizontal.

6. The burner/injector panel apparatus of claim 2, wherein the burner/injector panel is fluid cooled through the use of a fluid cooling circuit that is positioned along the periphery of the burner/injector panel.

7. The burner/injector panel apparatus of claim 1, wherein the discharge end of the burner/injector panel extends to a reach of approximately 40% of the distance from the point where the bottom of the burner/injector panel is in contact with the furnace wall to the metal line.

8. The burner/injector panel apparatus of claim 1, wherein the width of the mounting end ranges from 6 inches to 10 inches and the height of the mounting end ranges from 11 inches 17 inches.

9. The burner/injector panel apparatus of claim 8, wherein the remaining dimensions are from 5 inches to 10 inches in width at the broadest region of the burner/injector panel apparatus and from 8 inches to 38 inches in length for the burner/injector panel apparatus.

10. The burner/injector panel apparatus of claim 1, wherein the burner/injector panel includes one bore that traverses the mounting end, the first transition region, the first cylindrical region, the second transition region, the second cylindrical region and the terminating region of the burner/injector panel.

11. The burner/injector panel apparatus of claim 10, wherein one injection apparatus is positioned in the one bore of the burner/injector panel.

12. The burner/injector panel apparatus of claim 1, wherein the burner/injector panel further comprises shaped grooves along the upper outer surface of the first transition region of the burner/injector panel.

13. The burner/injector panel apparatus of claim 12, wherein the burner/injector panel further comprises shaped grooves along the upper outer surface of the first cylindrical region, the second transition region and the second cylindrical region.

14. The burner/injector panel apparatus of claim 1, wherein the burner/injector panel includes one bore and has one injection apparatus positioned in the one bore of the burner/injector panel.

15. A burner/injector panel apparatus to be mounted on the wall of a furnace that includes a furnace split line, a top shell and a bottom shell, said apparatus comprising:
  A) a burner/injector panel that has a first end and a discharge end and is formed in such a manner as to include (a) a mounting end as the first end; (b) a first transition region; (c) a first cylindrical region; (d) a second transition region; (e) a second cylindrical region; and (f) a terminating region as the discharge end;
  B) one bore that traverses the mounting end, the first transition region, the first cylindrical region, the second transition region, the second cylindrical region, and the terminating region of the burner/injector panel;
  C) one injection apparatus selected from an auxiliary thermal energy source, a particulate injector, or an oxygen injector and positioned within the one bore; and
  D) a water cooling circuit that is disposed along the periphery of the burner/injector panel; wherein the terminating region is in the shape of a half spheroid; the mounting end, the first transition region, the first cylindrical region, the second transition region, the second cylindrical region, and the terminating region of the burner/injector panel are in fluid communication with one another through the one bore that traverses the burner/injector panel; the first cylindrical region, the second transition region, and the second cylindrical region each include an upper outer surface that runs parallel to the one bore; the first transition region further includes grooves on the upper outer surface of the first transition region, the first cylindrical region, the second transition region and the second cylindrical region; the outer profile of the second transition region increases eccentrically from the first cylindrical region to second cylindrical region; and the burner/injector panel when mounted on the furnace wall extends outward and downward from the furnace wall such that the discharge end of the burner/injector panel extends to a reach of approximately 50% of the distance from the point where the bottom of the burner/injector panel is in contact with the furnace wall to the metal melt line and towards the metal melt line of the furnace at an angle from 42 to 48 degrees from the horizontal.

16. A burner/injector panel apparatus to be mounted on the wall of a furnace, said apparatus comprising:
  A) a burner/injector panel that has a first end and a discharge end and is formed in such a manner as to include (a) a mounting end as the first end; (b) a first transition region; (c) a first cylindrical region; and (d) a terminating region as the discharge end;
  B) one or more bores that traverse the mounting end, the first transition region, the first cylindrical region, and the terminating region of the burner/injector panel; and
  C) at least one injection apparatus selected from one or more of an auxiliary thermal energy source, a particulate injector, or an oxygen injector;
wherein the terminating region is in the shape of a half spheroid, the mounting end, the first transition region, the first cylindrical region and the terminating region of the burner/injector panel are in fluid communication with one another through the one or more bores that traverse the burner/injector panel; the first transition region, and the first cylindrical region includes an upper outer surface that runs parallel to the one or more bores; and the burner/injector panel when mounted on the furnace wall extends outward and downward from the furnace wall such that the discharge end of the burner/injector panel extends towards the metal melt line of the furnace.

17. The burner/injector panel apparatus of claim 16, wherein the burner/injector panel is a solid, continuously formed piece.

18. The burner/injector panel apparatus of claim 17, wherein the discharge end of the burner/injector panel extends at an angle from 35 degrees to 65 degrees from the horizontal.

19. The burner/injector panel apparatus of claim 17, wherein the width of the mounting end ranges from 7 inches to 11 inches and the height of the mounting end ranges from 11 inches 18 inches.

20. The burner/injector panel apparatus of claim 19, wherein the remaining dimensions are from 5 inches to 10 inches in width at the broadest region of the burner/injector panel apparatus and from 8 inches to 38 inches in length for the burner/injector panel apparatus.

21. The burner/injector panel apparatus of claim 17, wherein the burner/injector panel is fluid cooled through the use of a fluid cooling circuit that is positioned along the periphery of the burner/injector panel.

22. The burner/injector panel apparatus of claim 17, wherein the burner/injector panel further comprises shaped grooves along the upper outer surface of the first transition region of the burner/injector panel.

23. An electric arc furnace comprising:
  A) a furnace body having side walls and an electric arc, the side walls comprising a top shell, a bottom shell and a furnace split line;
  B) a burner/injector panel apparatus to be mounted on the wall of a furnace that includes a furnace split line, a top shell and a bottom shell, said panel apparatus comprising:
    1) a burner/injector panel that has a first end and a discharge end and is formed in such a manner as to include (a) a mounting end as the first end; (b) a first transition region; (c) a first cylindrical region; (d) a second transition region; (e) a second cylindrical region; and (f) a terminating region as the discharge end;
    2) one or more bores that traverse the mounting end, the first transition region, the first cylindrical region, the second transition region, the second cylindrical region, and the terminating region of the burner/injector panel; and
    3) at least one injection apparatus selected from one or more of a thermal energy source, a particulate injector, or an oxygen injector;
wherein the terminating region is in the shape of a half spheroid; the mounting end, the first transition region, the first cylindrical region, the second transition region, the second cylindrical region, and the terminating region of the burner/injector panel are in fluid communication with one another through the one or more bores that traverse the burner/injector panel; the first cylindrical region, the second transition region, and the second cylindrical region each include an upper outer surface that runs parallel to the one or more bores; the outer profile of the second transition region increases eccentrically from the first cylindrical region to the second cylindrical region; the at least one injection apparatus is positioned within the one or more bores; and the burner/injector panel when mounted on the furnace wall extends outward and downward from the furnace wall such that the discharge end of the burner/injector panel extends to, or below, the furnace split line and towards a metal melt line in the furnace.

24. A method of injecting a product selected from an oxy-fuel, a particulate or an oxygen containing gas, or mixtures thereof into a furnace from a burner/injector panel apparatus, said method comprising the step of injecting at least one product from an oxy-fuel, a particulate or an oxygen containing gas, or mixtures thereof toward a metal melt of the furnace from the a burner/injector panel apparatus, the furnace having a furnace split line, a top shell and a bottom shell, the burner/injector panel apparatus being mounted on the wall of a furnace, where:

said panel apparatus comprises:

1) a burner/injector panel that has a first end and a discharge end and is formed in such a manner as to include (a) a mounting end as the first end; (b) a first transition region; (c) a first cylindrical region; (d) a second transition region; (e) a second cylindrical region; and (f) a terminating region as the discharge end;

2) one or more bores that traverse the mounting end, the first transition region, the first cylindrical region, the second transition region, the second cylindrical region, and the terminating region of the burner/injector panel; and 3) at least one injection apparatus selected from one or more of a thermal energy source, a particulate injector, or an oxygen injector; the terminating region is in the shape of a half spheroid; the mounting end, the first transition region, the first cylindrical region, the second transition region, the second cylindrical region, and the terminating region of the burner/injector panel are in fluid communication with one another through the one or more bores that traverse the burner/injector panel; the first cylindrical region, the second transition region, and the second cylindrical region each include an upper outer surface that runs parallel to the one or more bores; the outer profile of the second transition region increases eccentrically from the first cylindrical region to the second cylindrical region; and the at least one injection apparatus is positioned within the one or more bores; and the burner/injector panel when mounted on the furnace wall extends outward and downward from the furnace wall such that the discharge end of the burner/injector panel extends to, or below, the furnace split line and towards a metal melt line in the furnace.

* * * * *